US012650614B2

(12) United States Patent
Goulet et al.

(10) Patent No.: US 12,650,614 B2
(45) Date of Patent: Jun. 9, 2026

(54) PAIR OF OPTICAL ELEMENT FOR AUGMENTED REALITY EQUIPMENT

(71) Applicant: Essilor International, Charenton-le-Pont (FR)

(72) Inventors: Alain Goulet, Charenton-le-Pont (FR); Samy Hamlaoui, Charenton-le-Pont (FR); Olivier Roussel, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 563 days.

(21) Appl. No.: 18/001,564

(22) PCT Filed: Jun. 4, 2021

(86) PCT No.: PCT/EP2021/064972
§ 371 (c)(1),
(2) Date: Dec. 12, 2022

(87) PCT Pub. No.: WO2021/254793
PCT Pub. Date: Dec. 23, 2021

(65) Prior Publication Data
US 2023/0236437 A1      Jul. 27, 2023

(30) Foreign Application Priority Data
Jun. 15, 2020     (EP) ..................................... 20305653

(51) Int. Cl.
*G02C 7/02*          (2006.01)
(52) U.S. Cl.
CPC .................................. *G02C 7/027* (2013.01)

(58) Field of Classification Search
CPC .......... G02C 7/027; G02C 7/024; G02C 7/02; G02C 7/06; G02C 7/061; G02C 7/063; G02C 7/065; G02C 7/066; G02C 7/068
USPC ....................................................... 351/159.4
See application file for complete search history.

(56) References Cited

U.S. PATENT DOCUMENTS

| | | | |
|---|---|---|---|
| 2,088,262 A | 7/1937 | Grano | |
| 2,696,757 A | 12/1954 | Richards | |
| 3,645,610 A | 2/1972 | Duckwall et al. | |
| 4,310,225 A | 1/1982 | Davis | |
| 2002/0008846 A1 | 1/2002 | Kelch | |
| 2005/0146681 A1* | 7/2005 | Kato ...................... | G02C 7/068 |
| | | | 351/159.42 |

(Continued)

FOREIGN PATENT DOCUMENTS

| | | |
|---|---|---|
| EP | 2 224 276 A1 | 9/2010 |
| EP | 2 548 533 A1 | 1/2013 |

(Continued)

OTHER PUBLICATIONS

EP3483681 (Year: 2019).*

(Continued)

*Primary Examiner* — Travis S Fissel
(74) *Attorney, Agent, or Firm* — Oblon, McClelland, Maier & Neustadt, L.L.P.

(57) ABSTRACT

A pair of ophthalmic lenses adapted for a wearer whose prescriptions for the left and right eye are different by at least 0.25D in cylinder, the rear surfaces of both ophthalmic lenses having a substantially identical shape.

17 Claims, 9 Drawing Sheets

(56) References Cited

U.S. PATENT DOCUMENTS

| | | | | |
|---|---|---|---|---|
| 2005/0179859 A1* | 8/2005 | Perrott | .................... | A61F 9/022 |
| | | | | 351/159.1 |
| 2017/0031179 A1 | 2/2017 | Guillot et al. | | |
| 2018/0239146 A1* | 8/2018 | Bierhuizen | ........ | G02B 17/0856 |
| 2019/0235280 A1 | 8/2019 | Spratt | | |

FOREIGN PATENT DOCUMENTS

| | | | |
|---|---|---|---|
| EP | 2 821 840 A1 | 1/2015 |
| JP | 2004-309971 A | 11/2004 |
| WO | WO-2004/090614 A1 | 10/2004 |
| WO | WO-2009/072528 A1 | 6/2009 |
| WO | WO 2017/001403 A1 | 1/2017 |
| WO | WO 2018/142405 A1 | 8/2018 |

OTHER PUBLICATIONS

International Search Report and Written Opinion mailed on Sep. 7, 2021 in PCT/EP2021/064972 filed on Jun. 4, 2021 (15 pages).
Japanese Office Action issued December 9. 2024 in Japanese Patent Application No. 2022-577188 (with English translation), 18 pages.
Office Action issued Nov. 12, 2025 in European Patent Application No. 21730902.0.

* cited by examiner

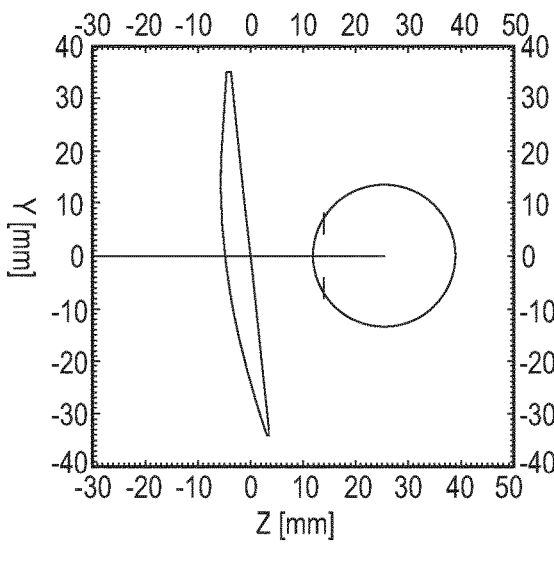
Fig. 7c
Fig. 8a
Fig. 8b
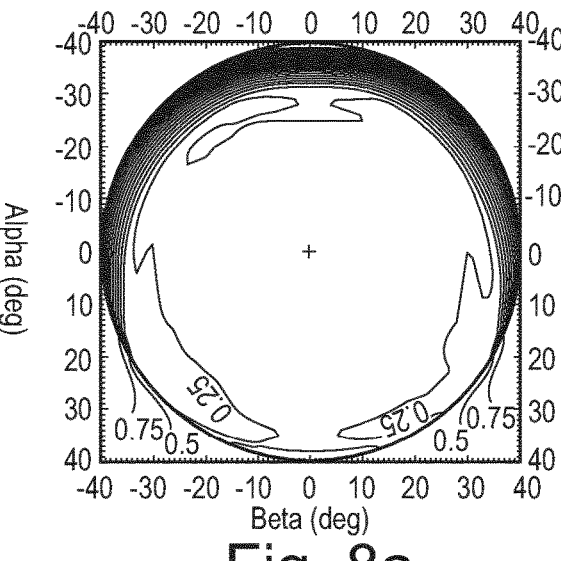
Fig. 8c

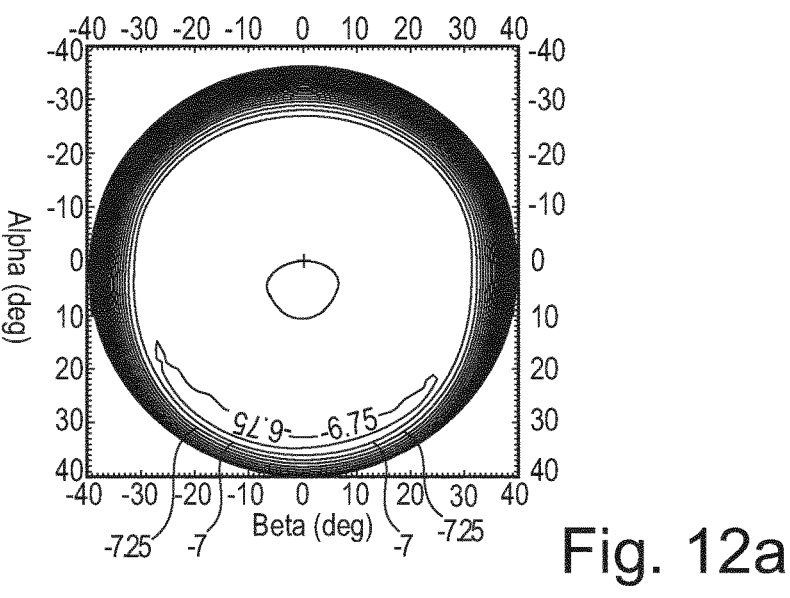
Fig. 12a
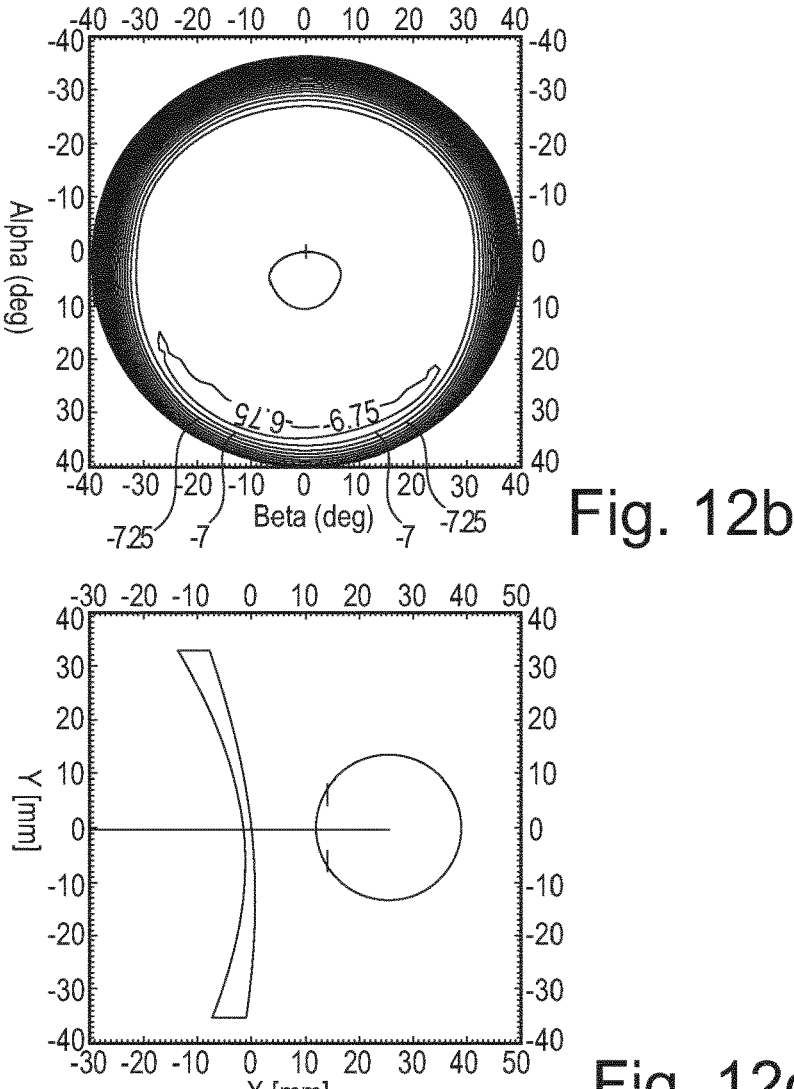
Fig. 12b
Fig. 12c

PAIR OF OPTICAL ELEMENT FOR AUGMENTED REALITY EQUIPMENT

TECHNICAL FIELD

The disclosure relates to a pair of ophthalmic lenses adapted for a wearer whose prescriptions for the left and right eye are different.

Furthermore, the disclosure relates to a method implemented by computer means for determining a pair of ophthalmic lenses adapted for a wearer and an apparatus for determining a pair of ophthalmic lenses adapted for a wearer, comprising processing circuitry.

BACKGROUND

It is known to provide a pair of optical lenses having an optical power within an augmented/virtual reality equipment to provide the user with an optical correction.

In some augmented reality equipment, it is needed to have a reference rear surface of said optical lenses that do not vary with prescriptions. Also, the rear surface may have to be located at a precise distance from the eye. It is therefore needed to control the position of the vertex of this reference rear surface with respect to the cornea center or eye rotation center. Moreover, the distance between the vertex of the reference rear surface and the cornea center may be requested to be fixed regardless the wearer prescription.

Using known solution, alike having the rear surface of the optical lens adapted according to the prescription of the user impacts the position of the lens rear surface.

For instance, if the optical lens is held by the front surface, the eye cornea—rear surface of the optical lens distance or eye rotation center—rear surface of the optical lens distance depends on the lens power, front surface curvature and lens thickness.

If the lens is held on the rear surface, the eye-lens distance is usually larger for negative lenses and closer for positive lenses.

So, depending on the wearer ametropia, user field of vision may vary. The field of vision depends on lens diameter and lens proximity. Therefore, there is a concern to provide suitable optical lens for augmented reality equipment.

Another concern arises also with negative power lenses. A standard negative power lens has a convex front surface with a low curvature and a concave rear surface providing most of the refraction. If this lens is held on the front surface, the edge of the negative lens rear surface may have a non-negligible thickness, and may interfere with the wearer eyelash. This prevents from proposing a refraction lens being very close to the wearer eye, and so limit the wearer field of view.

The invention aims to solve the above-mentioned concerns by providing a pair of ophthalmic lenses that can correct wearer refraction, with good optical quality, little optical aberration, and at the same time providing large field of view over a large range of wearer refractions.

SUMMARY

To this end, the disclosure proposes a pair of ophthalmic lenses adapted for a wearer whose prescriptions for the left and right eye are different by at least 0.25D in cylinder, wherein the rear surfaces of both ophthalmic lenses have a substantially identical shape.

Advantageously, the pair of ophthalmic lenses is arranged in such manner to ease the fixation of the pair of ophthalmic lenses in an augmented/virtual reality equipment while taking into consideration the required eye—lens distance. The eye—lens distance may be defined as the distance between the vertex of the rear surface of the ophthalmic lens and the cornea center or eye rotation center.

Another advantage is to provide different correction for each lens of the pair of ophthalmic lenses to improve the wearer correction while having substantially identical rear surface and low level of aberration.

In the case of an augmented reality equipment, the ophthalmic lens is embedded in the augmented reality equipment. The perception of the design of the lens by people surrounding the augmented reality equipment is not altered by the fact that the front and/or the rear surface of the ophthalmic lenses are customized so as to provide the desired dioptric function. The dioptric function corresponds to the optical lens power (mean power, astigmatism, etc.) as a function of the gaze direction.

Providing a similar rear surface to both lenses forming the pair of ophthalmic lenses enables to maintain a given distance between the vertex point of the rear surface of the ophthalmic lens and the cornea center or eye rotation center. The positioning of the ophthalmic lens rear surface with respect to the cornea and/or fixation points limit the risk of interference with the eyelashes, eyebrows or cheeks when the equipment is brought close to the eye. In such manner the augmented reality equipment can be rendered even more compact.

Further by determining an appropriate ophthalmic lens rear surface geometry, a bounding box occupied by the ophthalmic lens for a range of prescriptions can be minimized.

According to further embodiments which can be considered alone or in combination:

the rear surface of each ophthalmic lenses has a substantially identical shape in a wide range of prescriptions; and/or both ophthalmic lenses have rear surfaces having an absolute value difference of surfacic mean spherical power and an absolute value difference of surfacic cylindrical power at a given reference point smaller than or equal to 0.1 D; and/or both ophthalmic lenses have rear surfaces having an absolute value difference of surfacic mean spherical power and an absolute value difference of surfacic cylindrical power at any point over a given reference zone smaller than or equal to 0.1 D, preferentially smaller than or equal to 0.05 D; and/or each of the ophthalmic lens of the pair of ophthalmic lenses may have a flat, convex or concave rear surface; and/or both ophthalmic lenses have flat rear surfaces, wherein the absolute value of the surfacic mean spherical power and the absolute value of the surfacic cylindrical power at any point are smaller than or equal to 0.25 D; or both ophthalmic lenses have convex rear surfaces, wherein the surfacic mean spherical power at any point is greater than or equal to +0.25D; or both ophthalmic lenses have concave rear surfaces where the surfacic mean spherical power at any point is lower than or equal to −0.25D; and/or said pair of ophthalmic lenses is adapted to be mounted in a head-mounted display device to provide visual correction to the wearer; and/or specific wearing conditions are determined by the arrangement of the head-mounted display device for which the pair of ophthalmic lenses is adapted; and/or each ophthalmic lens meets optical performance criterion related to acuity drop and/or to power error and/or residual astigmatism error over a domain of gaze directions or lens area; and/or each of the ophthalmic lenses is a single vision ophthalmic lens; and/or each single vision ophthalmic lens as an absolute value of power error and a residual astigmatism error smaller than or equal to 0.5D, preferentially smaller than or equal to 0.25D for gaze directions within 30 deg from the primary gaze; and/or each of the ophthalmic lenses has a specific front surface, for example a non-spherical front surface, for example an aspherical front surface.

The disclosure further relates to a method implemented by computer means for determining a pair of ophthalmic lenses adapted for a wearer, the method comprises:

providing prescription data representative of the prescription of the wearer, providing wearing conditions data representative of given wearing conditions, providing rear surface data representative of its shape, determining a pair ophthalmic lenses having rear surfaces according to the rear surface data and a front surface adapted so as to provide in the given wearing conditions dioptric functions adapted to the provided prescription.

According to embodiments, the method implemented by computer means is configured for determining a pair of ophthalmic lenses adapted for a wearer, wherein the pair of ophthalmic lens is adapted for a wearer whose prescriptions for the left and right eye are different by at least 0.25D in cylinder, and wherein the rear surfaces of both ophthalmic lenses have a substantially identical shape.

Advantageously, the pair of ophthalmic lenses is determined in such manner to ease the fixation of the pair of ophthalmic lenses in an augmented/virtual reality equipment while taking into consideration the required eye-lens distance.

Another advantage is to provide different correction for each lens of the pair of ophthalmic lenses to improve the wearer correction while having a low level of aberration. Providing a similar rear surface to the pair of ophthalmic lenses enables to maintain a given distance between the vertex point of the rear surface of the ophthalmic lens and the cornea center or eye rotation center. The positioning of the ophthalmic lens rear surface with respect to the cornea and/or fixation points limit the risk of interference with the eyelashes, eyebrows or cheeks when the equipment is brought close to the eye. In such manner the augmented reality equipment can be rendered even more compact.

The disclosure further relates to an apparatus for determining a pair of ophthalmic lenses adapted for a wearer, comprising processing circuitry configured to:

receive prescription data representative of the prescription of the wearer, receive wearing conditions data representative of given wearing conditions, receive rear surface data representative of its shape, determine a pair of ophthalmic lenses having rear surfaces according to the rear surface data and a front surface adapted so as to provide in the given wearing conditions dioptric functions adapted to the provided prescription.

According to embodiments, the apparatus is configured for determining the pair of ophthalmic lenses adapted for a wearer, wherein the pair of ophthalmic lens is adapted for a wearer whose prescriptions for the left and right eye are different by at least 0.25D in cylinder, and wherein the rear surfaces of both ophthalmic lenses have a substantially identical shape.

Advantageously, the pair of ophthalmic lenses is manufactured in such manner to ease the fixation of the pair of ophthalmic lenses in an augmented/virtual reality equipment.

Advantageously, the pair of ophthalmic lenses consists in a lens configured to be disposed in front of a left eye and a lens configured to be disposed in front of a right eye.

According to further embodiments the disclosure relates to a pair of ophthalmic lenses adapted for a wearer, each ophthalmic lens having a dioptric function different one from the other in given wearing conditions, wherein the rear surfaces of both ophthalmic lenses have a substantially identical shape.

Advantageously, the pair of ophthalmic lenses is manufactured in such manner that at least one dioptric function is different for the left and right lenses of the pair of ophthalmic lenses and that the rear surfaces of both ophthalmic lenses have a substantially identical shape. The front surface of the ophthalmic lenses is calculated according to optical performance targets through an optimization process and machined by a surface generator.

According to further embodiments which can be considered alone or in combination:

each ophthalmic lens has the same refractive index; and/or the dioptric functions of both ophthalmic lenses have a difference of optical power at a given reference point greater than or equal to 0.25 D and/or a difference in astigmatism power greater than or equal to 0.25D; and/or wherein both ophthalmic lenses have rear surfaces having an absolute value difference of surfacic mean spherical power and surfacic cylindrical power at a given reference point smaller than or equal to 0.1 D; and/or both ophthalmic lenses have rear surfaces having an absolute value difference of mean spherical power over a given reference zone smaller than or equal to 0.1 D; and/or both ophthalmic lenses have flat rear surfaces, wherein the absolute values of the surfacic mean spherical power and surfacic cylindrical power at any point are smaller than or equal to 0.25 D; or both ophthalmic lenses have convex rear surfaces, wherein the surfacic mean spherical power at any point is higher than or equal to +0.25D; or both ophthalmic lenses have concave rear surfaces where the surfacic mean spherical power at any point is lower than or equal to −0.25D; and/or wherein said pair of ophthalmic lenses is adapted to be mounted in a head-mounted display device to provide visual correction to the wearer; and/or the specific wearing conditions are determined by the arrangement of the head-mounted display device for which the pair of ophthalmic lenses is adapted; and/or each ophthalmic lens meets optical performance criteria related to acuity drop and/or to power error and/or residual astigmatism error over a domain of gaze directions or lens area; and/or each of the ophthalmic lenses is a single vision ophthalmic lens; and/or

each single vision ophthalmic lens as a power error and a residual astigmatism error smaller than or equal to 0.5D, preferentially smaller than or equal to 0.25D for gaze directions within 30 deg from the primary gaze; and/or each of the ophthalmic lenses has a specific front surface, for example a non-spherical front surface, for example an aspherical front surface.

The disclosure also relates to a method implemented by computer means for determining a pair of ophthalmic lenses adapted for a wearer, the method comprises:

providing prescription data representative of the prescription of the wearer, providing wearing conditions data representative of given wearing conditions, providing rear surface data representative of its shape, determining a pair ophthalmic lenses having rear surfaces according to the rear surface data and a front surface adapted so as to provide in the given wearing conditions dioptric functions adapted to the provided prescription.

The disclosure also relates to an apparatus for determining a pair of ophthalmic lenses adapted for a wearer, comprising processing circuitry configured to:

receive prescription data representative of the prescription of the wearer, receive wearing conditions data representative of given wearing conditions, receive rear surface data representative of its shape, determine a pair of ophthalmic lenses having rear surfaces according to the rear surface data and a front surface adapted so as to provide in the given wearing conditions dioptric functions adapted to the provided prescription.

The invention further relates to a computer program product comprising one or more stored sequences of instructions that are accessible to a processor and which, when executed by the processor, causes the processor to carry out the steps of the methods according to the invention.

The invention also relates to a computer-readable storage medium having a program recorded thereon; where the program makes the computer execute the method of the invention.

Unless specifically stated otherwise, as apparent from the following discussions, it is appreciated that throughout the specification discussions utilizing terms such as "computing", "calculating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

Embodiments of the disclosure will now be described, by way of example only, and with reference to the following drawings in which:

FIGS. 3a to 6d illustrate maps of the dioptric power and astigmatism of different embodiments of ophthalmic lenses belonging to a pair of lens according to the disclosure prior and after optimization;

FIGS. 7a to 12c illustrates maps of the dioptric power, astigmatism and vertical cross section of different embodiment of ophthalmic lenses according to the disclosure prior and after optimization.

DETAILED DESCRIPTION

Elements in the figures are illustrated for simplicity and clarity and have not necessarily been drawn to scale. For example, the dimensions of some of the elements in the figure may be exaggerated relative to other elements to help improve the understanding of the embodiments of the present invention.

In the remainder of the description, terms like «upper», «lower», «front», «rear», or other words indicating relative position may be used. These terms are to be understood when the equipment comprising the pair of ophthalmic lenses is worn.

Figures 1A, 1B:
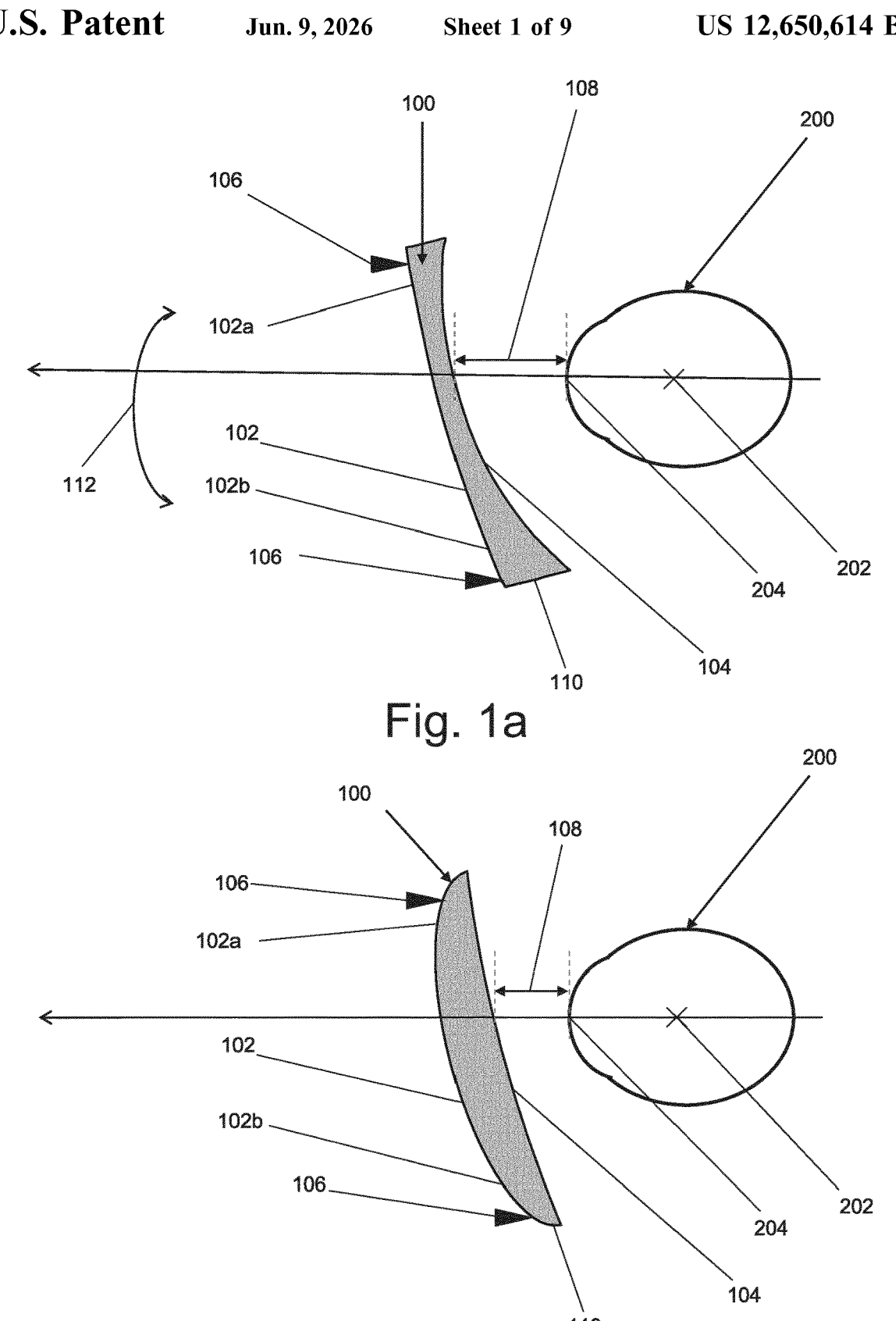
FIGS. 1a and 1b illustrate a sectional view of an ophthalmic lens according to the prior art.

FIGS. 1a and 1b illustrate a sectional view of an ophthalmic lens 100 and the eye 200 of a wearer. The ophthalmic lens 100 comprises a front surface 102 and a rear surface 104. The ophthalmic lens 100 of an augmented reality equipment is manufactured in a similar manner to the ophthalmic lens of spectacles, wherein the rear surface 104 is machined to provide the dioptric function to the wearer. The front surface 102 and the rear surface are linked one to another by an edge 110.

The ophthalmic lens 100 may be mounted within an augmented reality equipment (not shown) and maintained within said augmented reality equipment thanks to fixation means 106. The front surface 102 of the ophthalmic lens presents an upper end 102a and a lower end 102b configured to receive the fixation means 106.

The illustrated eye 200 comprises an eye rotation center 202 and a cornea center 204.

According to FIG. 1a, the illustrated ophthalmic lens 100 provides a negative dioptric optical power to the wearer. The ophthalmic lens 100 comprise a substantially slightly convex front surface 102 and a substantially concave rear surface 104.

According to FIG. 1b, the illustrated ophthalmic lens 100 provides a positive dioptric optical power to the wearer. The ophthalmic lens 100 comprise a substantially convex front surface 102 and a slightly concave rear surface 104.

The eye rotation center 202 or cornea center 204 of the eye 200 of the wearer needs to be located at a given eye-lens distance 108 from the rear surface 104 of the ophthalmic for a suitable use of the ophthalmic lens.

However, the eye-lens distance is dependent of the ophthalmic lens dioptric optical power, the front surface 102 curvature and the thickness of the ophthalmic lens 100. The eye-lens distance 108 is larger for ophthalmic lens 100 providing a negative dioptric optical power than positive dioptric optical power.

A wearer's field of view 112 depends on the size of the ophthalmic lens or an aperture in the augmented reality equipment, the prescription and the eye-lens distance. Then depending on the wearer ametropia, the field of view 112 may vary from a wearer to another.

Further, as illustrated in FIG. 1a, the ophthalmic lens 100, having a negative dioptric optical power, presents a substantially concave rear surface 104. If the optical lens 100 is held by the fixation means 106 on the front surface 102, the edge 110 may have a non-negligible thickness, and may interfere with the wearer eyelash, eyebrow or cheek.

An augmented reality equipment comprising an ophthalmic lens with a machined rear surface 104 providing most of the refraction and being held by fixation means 106 provided in the front surface 102 prevents from having an ophthalmic lens 100 being very close to the wearer eye 200, and thus limits the wearer's field of view 112.

Figures 2A, 2B:
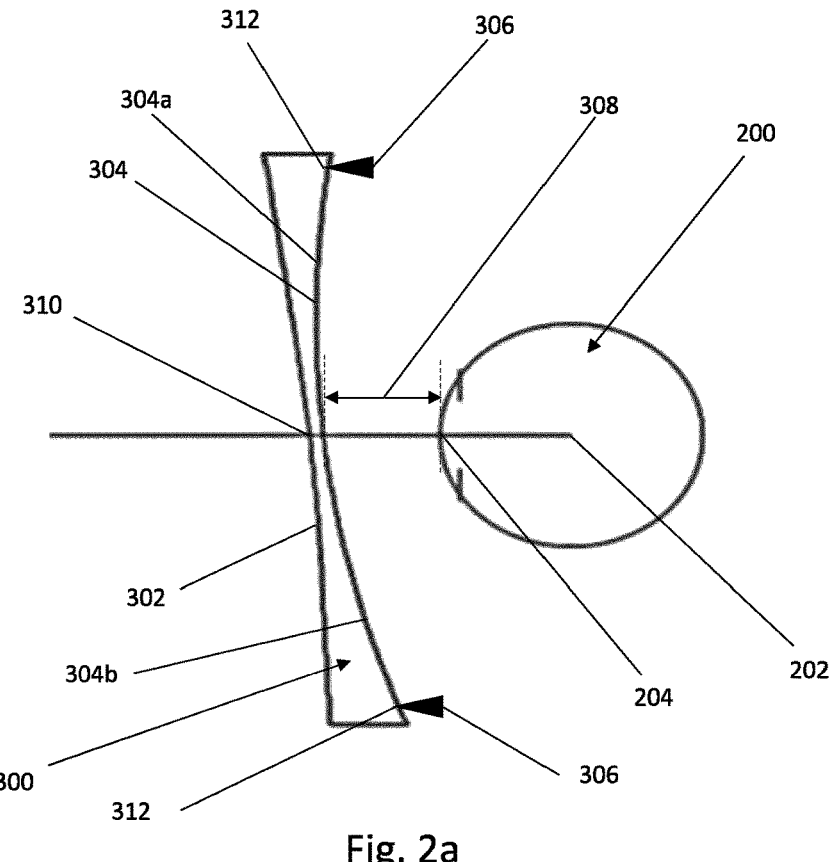
FIGS. 2a and 2b illustrate a sectional view of an ophthalmic lens according to the invention.

The FIGS. 2a and 2b illustrate a sectional view of an ophthalmic lens 300 and the eye of a wearer 200 according to the invention enabling to solve the concerns relative to the prior art pair of ophthalmic lenses.

According to the invention the pair of ophthalmic lenses 300 comprises a first lens, which may be called "left lens" configured to be disposed in front of a left eye of a wearer and a second lens, which may be called "right lens" configured to be disposed in front of a right eye of a wearer. The left and right lenses are adapted to the wearer, the left lens being calculated for a prescription relative to the left eye and the right lens being calculated for a prescription relative to the right eye.

Each of the ophthalmic lens 300 of the pair of ophthalmic lenses has a rear surface 304 having a substantially identical shape. The difference of prescription between both ophthalmic lenses 300 forming the pair of ophthalmic lenses is at least by 0.25D in cylinder.

Each ophthalmic lens 300 of the pair of ophthalmic lenses further comprises a front surface 302 which is determined to provide the wearer prescription.

The wearer prescription has to be understood as a set of optical characteristics of optical power, of astigmatism and, where relevant, of addition, determined by an ophthalmologist in order to correct the vision defects of an individual, for example by means of a lens positioned in front of his eye. Generally speaking, the prescription for a progressive addition lens comprises values of optical power and of astigmatism at the distance-vision point and an addition value.

The term "substantially identical shape" means hereby that the shape of the rear surfaces 304 of both ophthalmic lenses 300 forming the pair of ophthalmic lenses are identical on a main portion of the rear surfaces 304. There are some symmetrical geometric features as the pair of ophthalmic lenses 300 is provided for a left and a right eye 200.

The rear surface of the lens facing the left eye of the wearer and the lens facing the right eye of the wearer comprise respectively a meridian defining a nasal portion one side of the meridian and a temporal portion on another side of the meridian.

The term "substantially identical shape" is further defined in terms of symmetry with respect to the meridian of the lenses facing the left and the right eyes of the wearer.

The nasal portion of the lens facing the left eye of the wearer is symmetrical to the nasal portion of lens facing the right eye of the wearer, about to the meridian of the lens facing the left eye of the wearer, over at least 50% of the nasal portion of lens facing the right eye of the wearer, preferably over at least 80%.

The temporal portion of the lens facing the left eye of the wearer is symmetrical to the temporal portion of lens facing the right eye of the wearer, about to the meridian of the lens facing the left eye of the wearer, over at least 50% of the temporal portion of lens facing the right eye of the wearer, preferably over at least 80%.

The nasal portion of the lens facing the right eye of the wearer is symmetrical to the nasal portion of lens facing the left eye of the wearer, about to the meridian of the lens facing the right eye of the wearer, over at least 50% of the nasal portion of lens facing the left eye of the wearer, preferably over at least 80%.

The temporal portion of the lens facing the right eye of the wearer is symmetrical to the temporal portion of lens facing the left eye of the wearer, about to the meridian of the lens facing the right eye of the wearer, over at least 50% of the temporal portion of lens facing the left eye of the wearer, preferably over at least 80%.

The main portion of the rear surface 304 of the pair of ophthalmic lenses 300 corresponds to 40% of the rear surface of ophthalmic lenses, preferably more than 50%, preferably more than 60%, and even more preferably more than 70%.

Machining the front surface 302 of the ophthalmic lens 300 enables to correct the wearer refraction, with sufficient optical quality (e.g. little optical aberration), in a similar manner to known ophthalmic lenses 100 wherein the rear surface 104 is machined for the same result.

Providing a similar rear surface to both lenses forming the pair of ophthalmic lenses enables to maintain a given distance between the vertex point of the rear surface of the ophthalmic lens and the cornea center or eye rotation center. The positioning of the ophthalmic lens rear surface with respect to the cornea and/or fixation points limit the risk of interference with the eyelashes, eyebrows or cheeks when the equipment is brought close to the eye. In such manner the augmented reality equipment can be rendered even more compact.

The rear surface 304 is defined to be independent on refraction, in a wide range of prescriptions. The wide range may be defined as a range of prescription comprised between −5D and 5D.

In a specific embodiment, the rear surface 304 of each lens 300 of the pair of ophthalmic lenses 300 has the same substantially identical rear surfaces 304 for at least a range of dioptric optical power between −3D and +3D.

As the rear surface 304 is geometrically constrained, the front surface 302 of each lens 300 of the pair of ophthalmic lenses is determined to ensure a corrected vision for the wearer while enabling an alignment of the pair or ophthalmic lenses 300 being sensibly in a same plane once held in a head-mounted display.

In a specific embodiment, the pair ophthalmic lenses 300 have rear surfaces 304 having an absolute value difference of surfacic mean spherical power and an absolute value difference of surfacic cylindrical power at a given reference point smaller than or equal to 0.1 D.

As is known, the minimum and maximum radii of curvature R1 and R2 can be calculated at any point on a surface. The radius of curvature R1, R2 may be positive or negative. R1 or R2 is positive if the center of the sphere having a radius of curvature R1 or R2 tangent to the point on the surface is located in the direction of the eye relative to the surface. R1 or R2 is negative if the center of the sphere having a radius of curvature R1 or R2 tangent to the point on the surface is located in the opposite direction of the eye relative to the surface.

It can be noticed that when the surface is locally spherical, the local minimum radius of curvature R1 and the local maximum radius of curvature R2 are the same. When the surface is aspherical, the local minimum radius of curvature R1 and the local maximum radius of curvature R2 are different.

From the local radii of curvature R1 and R2 of a point on a surface, the local surfacic spherical powers labeled SPH1 and SPH2 can be deduced.

When the surface considered is the object side surface (also referred to as the front surface), the expressions are the following:

$$SPH1 = \frac{n-1}{R1} \quad SPH2 = \frac{n-1}{R2}$$

where n is the index of the constituent material of the lens, R1 and R2 are expressed in meters and SPH1 and SPH2 are expressed in diopters If the surface considered is an eyeball side surface (also referred to as the rear surface), the expressions are the following:

$$SPH1 = \frac{1-n}{R1} \quad SPH2 = \frac{1-n}{R2}$$

where n is the index of the constituent material of the lens, R1 and R2 are expressed in meters and SPH1 and SPH2 are expressed in diopters.

As is well known, a mean spherical power SPHmean at any point on an aspherical surface can be defined by the formula:

$S_{mean}=\frac{1}{2}*(SPH1+SPH2)$. A surfacic cylinder $CYL$ is also defined by the formula $CYL=|SPH1-SPH2|$ The characteristics of any aspherical surface of the pair of lenses may be expressed by the local mean spheres and cylinders.

The reference point may be the far vision point, the near vision point, the fitting cross or the prism reference point if the lens has markings, or the optical center or the prism reference point if the lens has no markings.

In a specific embodiment, the pair of ophthalmic lenses 300 has for each lens rear surface 304 an absolute value difference of surfacic mean spherical power and an absolute value difference of surfacic cylindrical power at any point over a given reference zone, for example, the zone of the ophthalmic lens 300 may be defined by the shape of a frame of a head-mounted display device, for example an augmented/virtual reality equipment intended to receive the pair of ophthalmic lenses, smaller than or equal to 0.1 D preferentially smaller than or equal to 0.05 D.

The reference zone may be defined inside a disc having a diameter greater than 5 mm, and smaller than 10 mm centered on a reference point. The reference point may be the prism reference point, the fitting cross, the near vision point or far vision point if micro-engravings are etched on the lens or the optical center for non-etched unifocal lens.

In a specific embodiment, both ophthalmic lenses 300 of the pair may have a flat rear surface, wherein the absolute value of the surfacic mean spherical power and the absolute value surfacic cylindrical power at any point are smaller than or equal to 0.25D.

According to embodiments, both ophthalmic lenses 300 of the pair may have non planar rear surfaces 304 where the surfacic mean spherical power at any point is greater than or equal to +0.25D.

In a specific embodiment, both ophthalmic lenses 300 of the pair may have convex rear surfaces 304 where the surfacic mean spherical power at any point is greater than or equal to +0.25D.

In another specific embodiment, both ophthalmic lenses 300 of the pair may have concave rear surfaces 304 where the surfacic mean spherical power at any point is lower than or equal to −0.25D.

Regarding this embodiment, it is considered that for a range of prescriptions, the rear surface 304 of the ophthalmic lens 300 remains the same. In such manner a set of ophthalmic lenses can be obtained, wherein the set comprise at least two different ophthalmic lenses. Any combination of the lenses according to the set can be used to define a pair of ophthalmic lens 300, taking into consideration that one ophthalmic lens is used for the left eye and one ophthalmic lens is used for the right eye.

In a specific embodiment, the pair of ophthalmic lenses 300 is adapted to be mounted in a head-mounted display device to provide visual correction to the wearer.

In a specific embodiment, specific wearing conditions are determined by the arrangement of the head-mounted display device for which the pair of ophthalmic lenses is adapted.

The wearing conditions may comprise the pantoscopic angle, the wrap angle, an eye-lens distance 308 between a vertex of the rear surface 304 of the ophthalmic lens 300 and the center of cornea 204.

The pantoscopic angle is the angle in the vertical plane between the optical axis of the ophthalmic lens 300 and the visual axis of the eye in the primary position, usually taken to be the horizontal when the wearer is looking straight.

The wrap angle is the angle in the horizontal plane between the optical axis of the ophthalmic lens 300 and the visual axis of the eye in the primary position, usually taken to be the horizontal.

The eye-lens distance 308 is the distance between a vertex 310 of the rear surface 304 of the ophthalmic lens 300 and the apex of the cornea, measured usually along the visual axis of the eye in the primary position, usually taken to be the horizontal. Hereby the eye-lens distance 308 may take into consideration the apex of the cornea, being the center of cornea 204, or the eye center of rotation 202.

The pair of ophthalmic lenses 300 may have a non-zero curvature on the rear surface of each lens which enables to provide the same eye-lens distance 308 for two ophthalmic lenses 300 performing different correction without inducing aberration.

The rear surface 304 has an upper end 304a and a lower end 304b configured to receive fixations means 306. The fixation means 306 enable the ophthalmic lens to be mounted in a head-mounted display device.

The head-mounted display device may be an augmented reality equipment.

The fixation means 306 are holding the ophthalmic lens 300 on its rear surface 304, so that the ophthalmic lens rear surface 304, at the vertex point 310 should be at a precise eye-lens distance 308 from the eye rotation center 202 or the cornea center 204.

More generally, it can be desired that, for a range of gaze directions, eye-lens distances between the rear surface 304 of the ophthalmic lens and eye rotation center 202 or cornea center 204 correspond to specific distances, defining the rear surface 304 area at a precise location from the eye 200 of the wearer.

The positioning of the rear surface 304 and the geometry of each ophthalmic lens 300 of the pair of ophthalmic lens can be constrained by the eye-lens distance 308.

The rear surface 304 comprises a plurality of fixation points 312 located in the upper end 304a and the lower end 304b of the rear surface 304 of the ophthalmic lens 300, each fixation point 312 being configured to receive the fixation mean 306.

Preferably the rear surface 304 comprises at least three fixation points 312 to ensure unique positioning of the ophthalmic lens 300 into the frame of the equipment and/or maintaining precise distances between the eye 200 and the ophthalmic lens rear surface 304 for a range of gazes.

When a lens rear surface 304 is imposed, one needs to optimize the front surface 302 to ensure a corrected vision for the wearer. The optimization process is similar to the usual one except that the surface to be optimized is not the rear surface but the front surface.

The ophthalmic lens 300 according to the invention corrects the wearer refraction, with sufficient optical quality (e.g. little optical aberration), and at the same time providing large field of view (shown in FIG. 3) regardless the wearer refraction, thanks to the arrangement of fixation means 306 on the rear surface 304 of the ophthalmic lens 300.

In a specific embodiment, each ophthalmic lens 300 of the pair meets some optical performance criteria related to acuity drop and/or to optical power error and/or residual astigmatism error over a domain of gaze directions or lens area.

The residual astigmatism is defined by the difference between the astigmatism that is prescribed to the wearer and the astigmatism generated by the lens.

A domain of gaze directions is defined hereby by a plurality of gaze directions which may be represented by a cone whose apex is the eye center of rotation or any other form. All the gaze directions intercept the rear surface 304 of the ophthalmic lens 300.

In a specific embodiment, each of the ophthalmic lenses 300 is a single vision ophthalmic lens.

In a more specific embodiment, each single vision ophthalmic lens of the pair of ophthalmic lenses has an absolute value of power error and a residual astigmatism error smaller than or equal to 0.5D, preferentially smaller than or equal to 0.25D for gaze directions within 30 degree from the primary gaze.

Having a low power error and residual astigmatism in a domain of gaze direction forming a cone of 30 degrees from the primary gaze direction, enables a sufficient optical quality, e.g. little optical aberrations, within the principal domain of gaze direction of the wearer.

In another specific embodiment, the ophthalmic lens may be a bi-focal, tri-focal or progressive addition lens.

In a specific embodiment, each of the ophthalmic lenses 300 has a specific front surface, for example a non-spherical front surface, for example an aspherical front surface 302.

The front surface 302 of the ophthalmic lens 300 is machined to enable to correct the wearer refraction, with sufficient optical quality in a similar manner to known ophthalmic lenses 100 wherein the rear surface 104 is machined for the same result.

The fact that the front surface 302 is machined to provide the optical function and most of the refraction of the ophthalmic lens 300, the front surface 302 of the ophthalmic lens 300 can present different form and thus may be a non-spherical or aspherical surface.

The disclosure further relates to a method implemented by computer means for determining a pair of ophthalmic lenses adapted for a wearer, the method comprises:

providing prescription data representative of the prescription of the wearer, providing wearing conditions data representative of given wearing conditions, providing rear surface data representative of a shape, determining a pair ophthalmic lenses having a rear surfaces according to the rear surface data and a front surface adapted so as to provide in the given wearing conditions dioptric functions adapted to the provided prescription.

Providing the prescription and the given wearing conditions relative to the wearer enables to take into consideration the constraints relative to the wearer for the design of the pair of ophthalmic lenses 300.

The rear surface 304 of each ophthalmic lens 300, of the pair of ophthalmic lens 300, is also constrained, so that once the ophthalmic lens 300 is held by the fixation means 306 of the augmented reality equipment, the ophthalmic lens rear vertex 310 is located at a specific eye-lens distance 308 from the eye rotation center 202 or the cornea center of the wearer regardless the prescription of the wearer.

As the rear surface 304 of each ophthalmic lens 300, of the pair of ophthalmic lens, is constrained, the front surface 302 of each of the ophthalmic lens 300 forming the pair is machined to provide to the wearer a vision correction adapted to the provided prescriptions and wearing conditions.

The invention further relates to an apparatus comprising a processing circuitry adapted to store one or more sequence of instructions and to carry out at least one of the steps of the method according to the invention. The apparatus is configured to determine a pair of ophthalmic lenses adapted for a wearer, by executing the following steps:

receiving prescription data representative of the prescription of the wearer, receive wearing conditions data representative of given wearing conditions, receiving rear surface data representative of its shape determining a pair of ophthalmic lenses having rear surfaces according to the rear surface data and a front surface adapted so as to provide in the given wearing conditions dioptric functions adapted to the provided prescription.

The method is implemented by an apparatus comprising processing circuitry, such as a computer or a microcontroller.

The invention further relates to a computer program product comprising one or more stored sequences of instructions that are accessible to a processor and which, when executed by the processor, causes the processor to carry out the steps of the following method:

providing prescription data representative of the prescription of the wearer, providing wearing conditions data representative of given wearing conditions, providing rear surface data representative of a shape, determining a pair ophthalmic lenses having rear surfaces according to the rear surface data and a front surface adapted so as to provide in the given wearing conditions dioptric functions adapted to the provided prescription.

The invention also relates to a computer-readable storage medium having a program recorded thereon; where the program makes the computer execute the method of the invention.

The obtention of a pair of ophthalmic lenses 300 according to the invention and its positioning within an augmented reality equipment is detailed afterwards.

Instead of optimizing a rear surface 304 of each ophthalmic lens knowing a front surface 302 of each ophthalmic lenses, the front surface 302 is optimized knowing the rear surface 304 so that the optical performances match an optical performance target, for example corresponding to the prescription of the wearer and optionally considering the wearing conditions. A final pair of ophthalmic lenses 300 can be obtained from lens targets such as Best Form lenses or a Tscherning lenses.

It will be further considered that a pair of ophthalmic lenses according to the disclosure comprise a first ophthalmic lens and a second ophthalmic lens. When the pair of ophthalmic lenses is mounted into the augmented/virtual reality equipment, the first ophthalmic lens, respectively the second ophthalmic lens, is configured to be facing the left eye, respectively the right eye, of the wearer, when the augmented/virtual reality equipment is worn.

Following the positioning of the first and second ophthalmic lenses of the pair of ophthalmic lenses relative to the frame of the augmented/virtual reality equipment, the first and second ophthalmic lenses can be defined knowing a plurality of parameters, such as:

the rear surface of the first, respectively the second, ophthalmic lens being defined and the positioning of the first, respectively the second, ophthalmic lens, which may depends on the wearing conditions, in the first eye referential, respectively the second eye referential, the first and second ophthalmic lenses refractive index, the wearer prescription relative to the left and right eyes, eventually including an addition, a contour or shape of the pair of first and second ophthalmic lenses, and constraints such as minimum center, and/or first and second ophthalmic lenses edge thicknesses, prism thinning for progressive addition lens).

From these inputs, a spherical or a torical front surface can be calculated so that the front surface curvatures provide the prescription wanted at a reference point. The reference point may be the far vision point or near vision point if each of the ophthalmic lens of the pair has markings. Otherwise the reference point may be the optical center.

Estimates of these curvatures may be obtained thanks to the Gullstrand formula.

The front surface of the first and ophthalmic lenses, may be modified, independently, through an optimization process so that the differences between the targeted optical performances and the optical performances of the ophthalmic pair of lenses are minimized.

The optimization can occur through an iterative process where a merit function represents the differences of one or several optical criteria (e.g. wearer optical power and/or astigmatism) over a domain gaze directions defined by a cone having a given angle.

This optimization process can take into account the mounting parameters of the first and second ophthalmic lenses rear surface positioning, relative to the augmented/virtual reality equipment.

The front surface of the first and second ophthalmic lenses of the pair of ophthalmic lenses may be modeled by Zernike polynomials, B-splines or nurbs.

The merit function may be the sum of the square residuals difference between the optical performances of the target ophthalmic lens and the ophthalmic lens 300. By optical performances, it is understood the wearer optical power, and/or the astigmatism, and/or the drop of acuity.

The merit function is preferably calculated on the surface area delimited by the first and second ophthalmic lenses contour.

In some embodiment, the first and second ophthalmic lenses front surface and/or the translations and rotations to pass from the front to the rear surface are adjusted so that the first and second lenses optical power at the far vision point corresponds to the prescriptions relative to the left and right eye of the wearer, and that all constraints, regarding the prescription and the geometry of the first and second ophthalmic lenses rear surface are met.

FIGS. 3a to 9b discloses different embodiments of ophthalmic lenses according to the disclosure. For these different embodiments of the disclosure the material of pair of lenses is Mr8. The pair of ophthalmic lenses is mounted in an augmented/virtual reality equipment according to the following mounting parameters:

a pantoscopic angle of −6°, a wrap angle of 0°, and an eye cornea—rear surface of the ophthalmic lens distance of 12 mm.

Figures 3A, 3B, 3C, 3D, 4A, 4B:
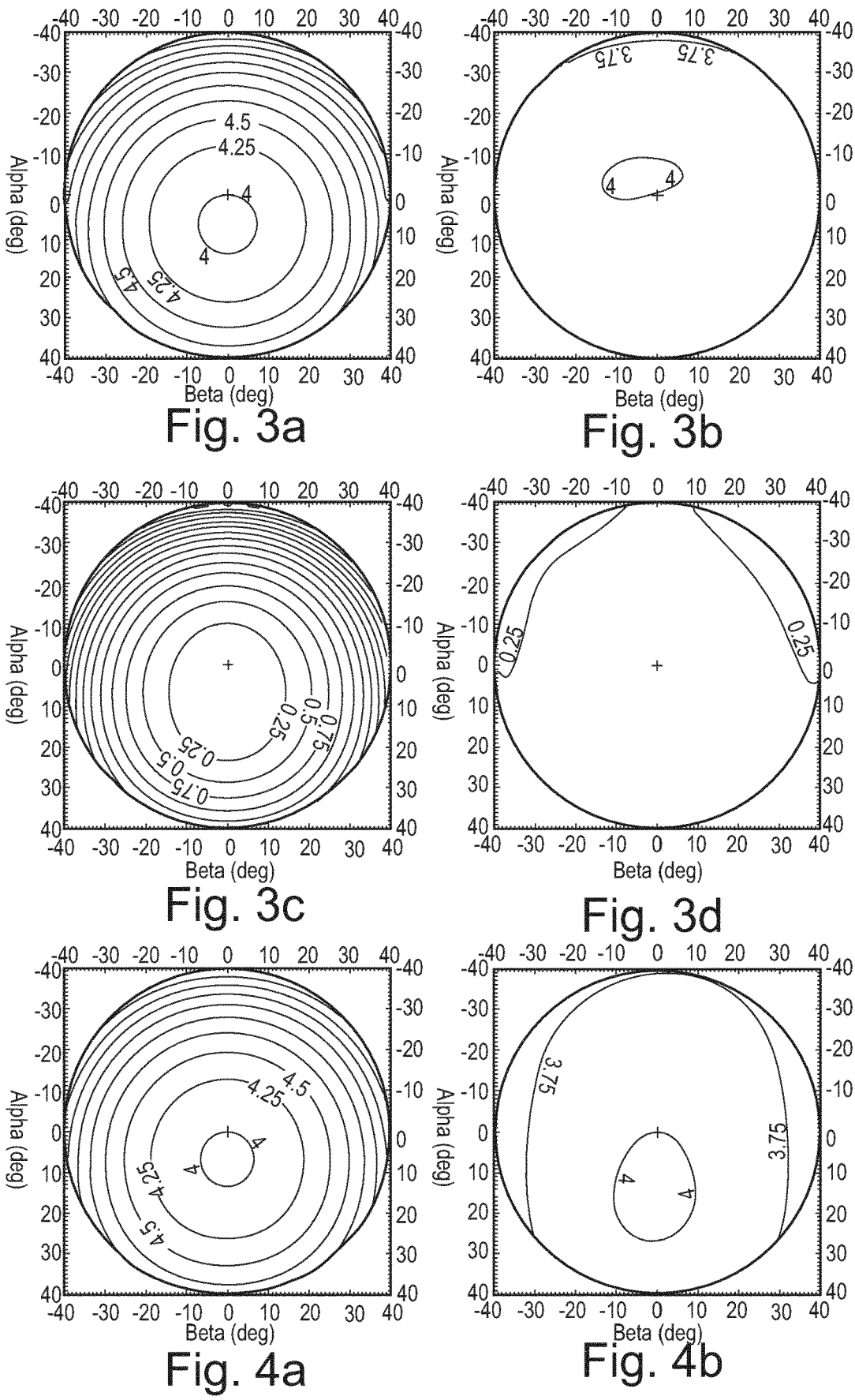

In the embodiments corresponding to FIGS. 3a to 6d, the rear surface of the ophthalmic lenses is flat. FIGS. 3a to 3d illustrate a first embodiment, wherein the ophthalmic lens is a single vision lens having a spherical power of +4D, the lens being configured to be disposed in front of the left eye of a wearer. Respectively, FIGS. 4a to 4d illustrate a second embodiment, wherein the ophthalmic lens is a single vision lens having a spherical power of +5D, a cylindrical power of −2D and a cylinder axis of 0 deg, the lens being configured to be disposed in front of the right eye of a wearer. FIGS. 3a and 4a illustrate a map of the optical power prior to the optimization where the front surface of the ophthalmic lenses are either spherical or torical. FIGS. 3b and 4b illustrate the map of the optical power after the optimization of the front surfaces. FIGS. 3c and 4c illustrate a map of the astigmatism prior to the optimization and FIGS. 3d and 4d illustrate the map of the astigmatism after the optimization. It is to be noticed that once optimized, the difference between the minimal and maximal value of the optical power and the astigmatism is less important, and therefore the usage of said lens is more comfortable for the wearer.

Figures 4C, 4D, 5A, 5B, 5C, 5D:
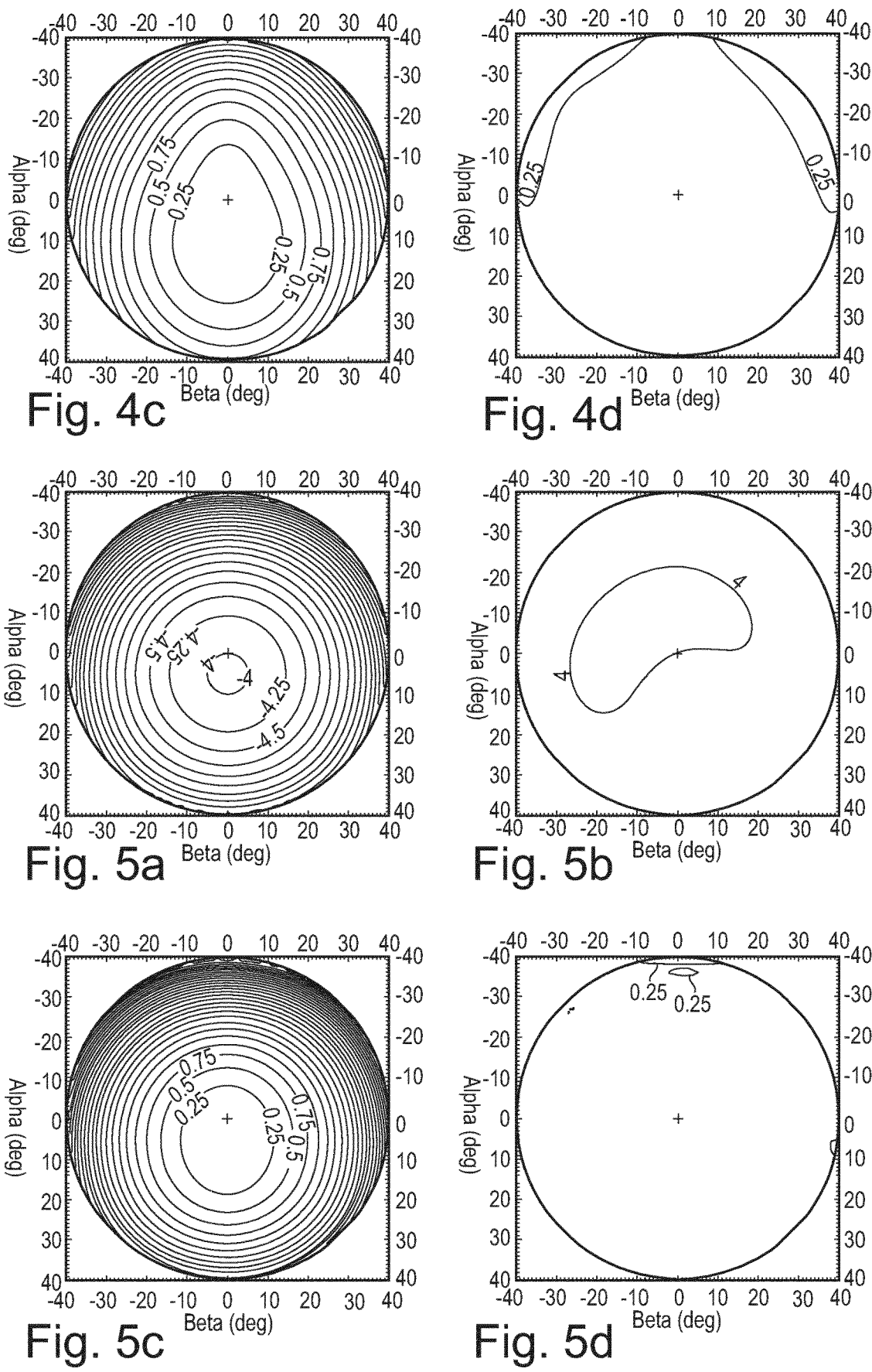
Figures 6A, 6B, 6C, 6D, 7A, 7B:
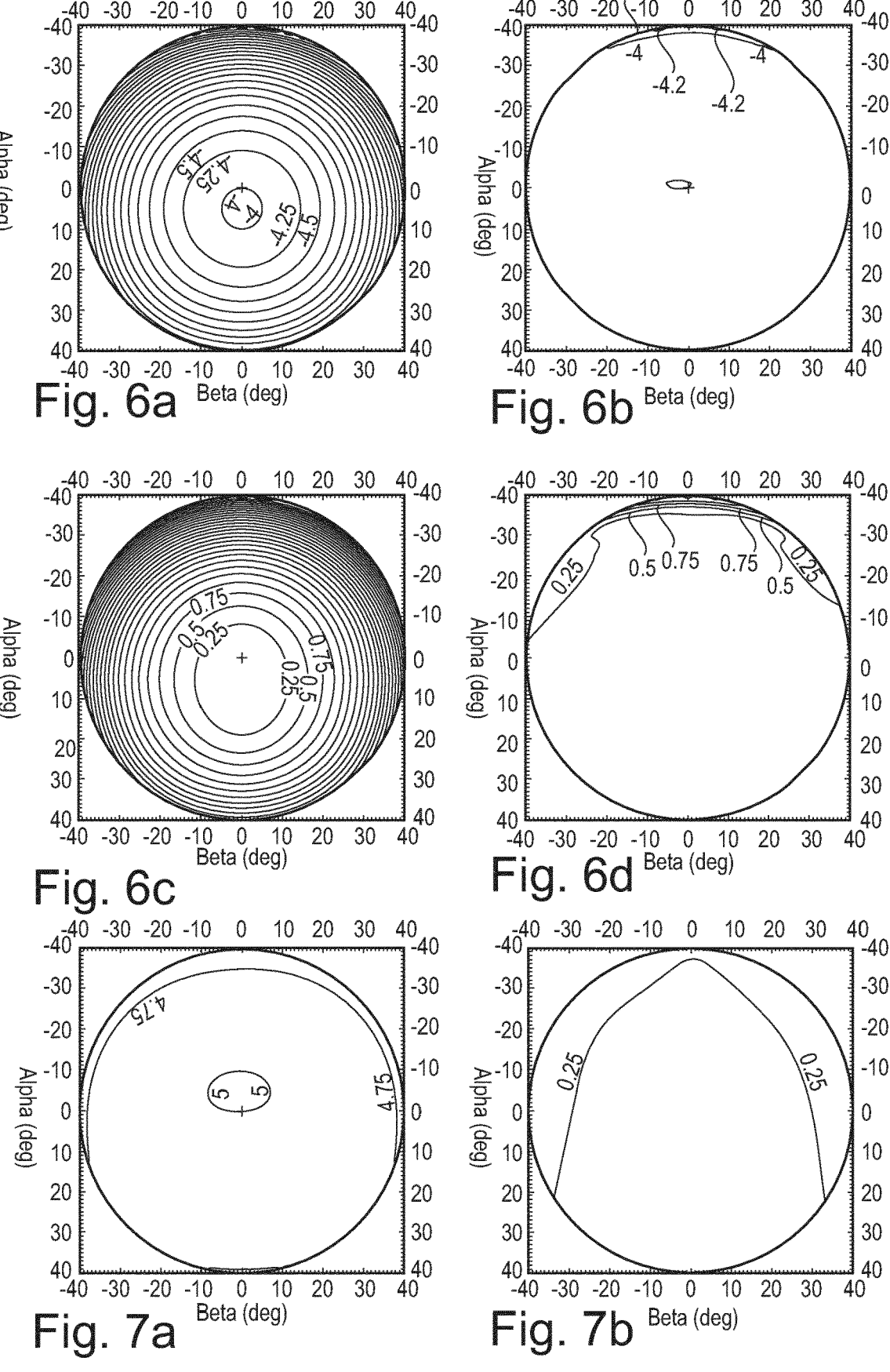

FIGS. 5a to 5d illustrate a third embodiment, wherein the ophthalmic lens is a single vision lens having a spherical power of −4D, the lens being configured to be disposed in front of the left eye of a wearer. Respectively, FIGS. 6a to 6d illustrate a fourth embodiment, wherein the ophthalmic lens is a single vision lens having a spherical power of −3D, a cylinder power of −2D and a cylinder axis of 0 deg, the lens being configured to be disposed in front of the right eye of a wearer. FIGS. 5a and 6a illustrate a map of the optical power prior to the optimization where the front surface of the ophthalmic lenses are either spherical or torical. FIGS. 5b and 6b illustrate the map of the optical power after the optimization. FIGS. 5c and 6c illustrate a map of the astigmatism prior to the optimization of the front surface of the ophthalmic lens and FIGS. 5d and 6d illustrate the map of the astigmatism after the optimization. It is to be noticed that once optimized, the difference between the minimal and maximal value of the optical power and the astigmatism is less important, and therefore the usage of said lens is more comfortable for the wearer.

Regarding the embodiments listed below, wherein the rear surface of ophthalmic lenses is either flat, convex or concave, the rear surface of either the left and right ophthalmic lenses has the same substantially identical rear surfaces in a wide range of prescriptions.

FIGS. 7a to 7c illustrate a fifth embodiment, wherein the ophthalmic lens is a single vision lens having a spherical power of +5D, wherein the rear surface is flat. Respectively, FIGS. 8a to 8c illustrate a sixth embodiment, wherein the ophthalmic lens is a single vision lens having a spherical power of −7D, wherein the rear surface is flat. FIGS. 7a and 8a illustrate a map of the optical power after an optimization of the front surface of the ophthalmic lens. FIGS. 7b and 8a illustrate a map of the astigmatism after the optimization. FIGS. 7c and 8c illustrate a vertical cross section of the ophthalmic lens according to the embodiment.

The fifth and sixth embodiments disclose that good optical performances can be achieved for a large range of spherical power, from −7D to +5D, wherein the optical lenses configured to be disposed in front of the left and right eyes of the wearer have a substantially identical flat rear surface.

Figures 9A, 9B, 9C, 10A, 10B:
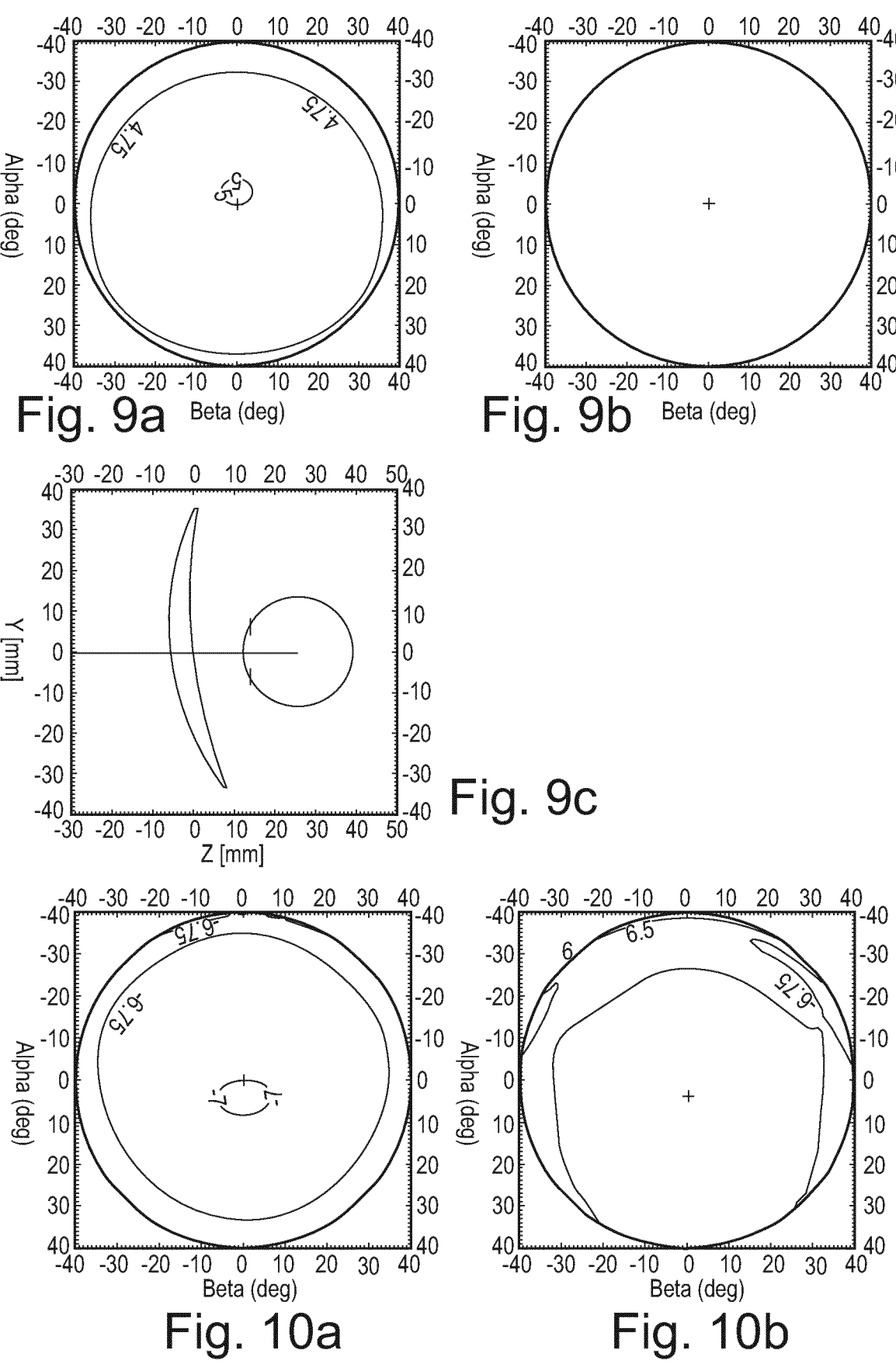
Figure 10C:
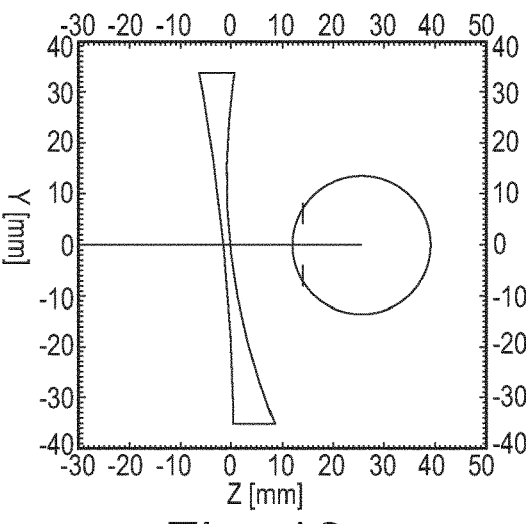

FIGS. 9a to 9c illustrate a seventh embodiment, wherein the ophthalmic lens is a single vision lens having a spherical power of +5D, wherein the rear surface is a concave spherical surface with a surfacic spherical power of −4.54 D. Respectively, FIGS. 10a to 10c illustrate an eighth embodiment, wherein the ophthalmic lens is a single vision lens having a spherical power of −7D, wherein the rear surface is a concave spherical surface with a surfacic spherical power of −4.54 D. FIGS. 9a and 10a illustrate a map of the optical power after an optimization of the front surface of the ophthalmic lens. FIGS. 9b and 10b illustrate a map of the astigmatism after the optimization. FIGS. 9c and 10c illustrate a vertical cross section of the ophthalmic lens according to the embodiment.

The seventh and eight embodiments disclose that good optical performances can be achieved for a large range of spherical power, from −7D to +5D, wherein the optical lenses configured to be disposed in front of the left and right eyes of the wearer have a substantially identical concave rear surface.

Figure 11A:
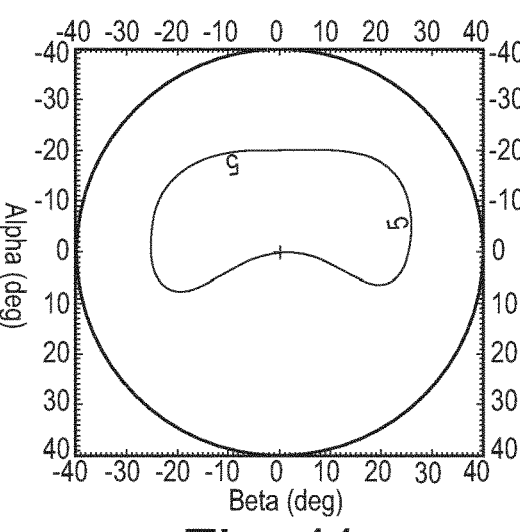
Figure 11B:
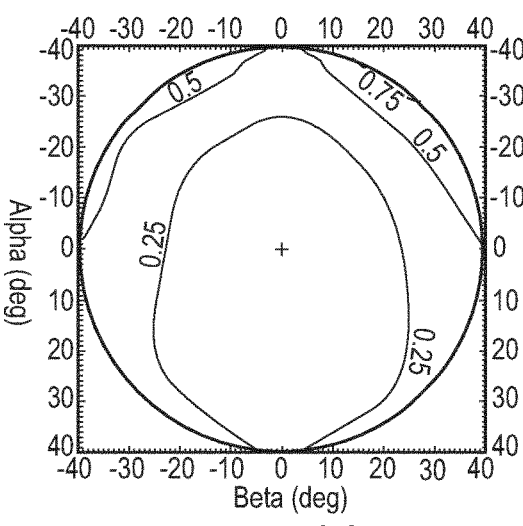
Figure 11C:
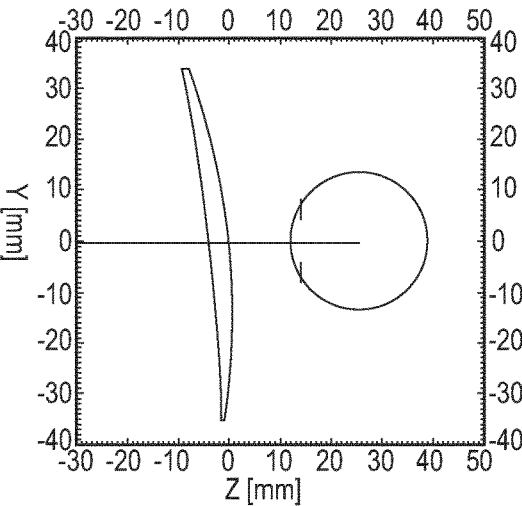

FIGS. 11a to 11c illustrate a ninth embodiment, wherein the ophthalmic lens ophthalmic is a single vision lens having a spherical power of +5D, wherein the rear surface is a convex spherical surface with a surfacic spherical power of +4.54 D. Respectively, FIGS. 12a to 12c illustrate a tenth embodiment, wherein the ophthalmic lens is a single vision lens having a spherical power of −7D, wherein the rear surface is a convex spherical surface with a surface spherical power of +4.54 D. FIGS. 11a and 12a illustrate a map of the optical power after an optimization of the front surface of the ophthalmic lens. FIGS. 11b and 12b illustrate a map of the astigmatism after the optimization. FIGS. 11c and 12c illustrate a vertical cross section of the ophthalmic lens according to the embodiment.

The ninth and tenth embodiments disclose that good optical performances can be achieved for a large range of spherical power, from −7D to +5D, wherein the optical lenses configured to be disposed in front of the left and right eyes of the wearer have a substantially identical convex rear surface.

The disclosure has been described above with the aid of embodiments without limitation of the general inventive concept.

Many further modifications and variations will suggest themselves to those skilled in the art upon making reference to the foregoing illustrative embodiments, which are given by way of example only and which are not intended to limit the scope of the disclosure, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the disclosure.

The invention claimed is:

1. A pair of ophthalmic lenses comprising:
rear surfaces, wherein
the ophthalmic lenses are adapted for a wearer whose prescriptions for a left and a right eye are different by at least 0.25D in cylinder,
the rear surfaces of both ophthalmic lenses have a substantially identical shape such that shapes of the rear surfaces are identical over at least 50% of the rear surface area of ophthalmic lenses and symmetrical between nasal and temporal portions over at least 80%, and
the rear surfaces of the ophthalmic lenses have the substantially identical shape in a range of prescriptions from −5D to 5D, the rear surfaces being defined to be independent of refraction in the range, such that a set of ophthalmic lenses are obtainable, each having a rear surface of the same substantially identical shape applicable to different prescriptions within the range.

2. The pair of ophthalmic lenses according to claim 1, wherein
the rear surfaces have an absolute value difference of surfacic mean spherical power and an absolute value difference of surfacic cylindrical power at a given reference point smaller than or equal to 0.1 D.

3. The pair of ophthalmic lenses according to claim 1, wherein
said pair of ophthalmic lenses are adapted to be mounted in a head-mounted display device, and
the rear surfaces have an absolute value difference of surfacic mean spherical power and an absolute value difference of surfacic cylindrical power at any point over a given reference zone smaller than or equal to 0.1 D, said reference zone being defined by a shape of a frame of the head-mounted display device.

4. The pair of ophthalmic lenses according to claim 1, wherein the rear surfaces are flat, wherein the absolute value of a surfacic mean spherical power and the absolute value of a surfacic cylindrical power at any point are smaller than or equal to 0.25 D.

5. The pair of ophthalmic lenses according to claim 1, wherein the rear surfaces are non planar, wherein a surfacic mean spherical power at any point is greater than or equal to +0.25D.

6. The pair of ophthalmic lenses according to claim 1, wherein the rear surfaces are convex, wherein a surfacic mean spherical power at any point is greater than or equal to +0.25D.

7. The pair of ophthalmic lenses according to claim 1, wherein the rear surfaces are concave, wherein a surfacic mean spherical power at any point is lower than or equal to −0.25D.

8. The pair of ophthalmic lenses according to claim 1, wherein said pair of ophthalmic lenses is adapted to be mounted in a head-mounted display device to provide visual correction to the wearer.

9. The pair of ophthalmic lenses according to claim 8, wherein specific wearing conditions are determined by an arrangement of the head-mounted display device for which the pair of ophthalmic lenses is adapted.

10. The pair of ophthalmic lenses according to claim 1, wherein each ophthalmic lens meets optical performance criterion related to acuity drop and/or to power error and/or residual astigmatism error over a domain of gaze directions or lens area.

11. The pair of ophthalmic lenses according to claim 1, wherein each of the ophthalmic lenses is a single vision ophthalmic lens.

12. The pair of ophthalmic lenses according to claim 11, wherein each single vision ophthalmic lens as an absolute value of power error and a residual astigmatism error smaller than or equal to 0.5D for gaze directions within 30 deg from the primary gaze.

13. A method implemented by processing circuitry for determining a pair of ophthalmic lenses adapted for a wearer, the method comprising:

receiving prescription data representative of a prescription of the wearer;

receiving wearing conditions data representative of given wearing conditions;

receiving rear surface data representative of a shape; and determining the pair of ophthalmic lenses having rear surfaces with a shape according to the rear surface data and front surfaces adapted so as to provide in the given wearing conditions dioptric functions adapted to the prescription, wherein the ophthalmic lenses are adapted for the wearer whose prescriptions for a left and a right eye are different by at least 0.25D in cylinder, the rear surfaces of both ophthalmic lenses have a substantially identical shape such that shapes of the rear surfaces are identical over at least 50% of the rear surface area of ophthalmic lenses and symmetrical between nasal and temporal portions over at least 80%, and the rear surfaces of the ophthalmic lenses have the substantially identical shape in a range of prescriptions from −5D to 5D, the rear surfaces being defined to be independent of refraction in the range, such that a set of ophthalmic lenses are obtainable, each having a rear surface of the same substantially identical shape applicable to different prescriptions within the range.

14. An apparatus for determining a pair of ophthalmic lenses adapted for a wearer, the apparatus comprising:

processing circuitry configured to:

receive prescription data representative of a prescription of the wearer, receive wearing conditions data representative of given wearing conditions, receive rear surface data representative of a shape, and determine the pair of ophthalmic lenses having rear surfaces according to the rear surface data and front surfaces adapted so as to provide in the given wearing conditions dioptric functions adapted to the prescription, wherein the ophthalmic lenses are adapted for the wearer whose prescriptions for a left and a right eye are different by at least 0.25D in cylinder, the rear surfaces of both ophthalmic lenses have a substantially identical shape such that shapes of the rear surfaces are identical over at least 50% of the rear surface area of ophthalmic lenses and symmetrical between nasal and temporal portions over at least 80%, and the rear surfaces of the ophthalmic lenses have the substantially identical shape in a range of prescriptions from −5D to 5D, the rear surfaces being defined to be independent of refraction in the range, such that a set of ophthalmic lenses are obtainable, each having a rear surface of the same substantially identical shape applicable to different prescriptions within the range.

15. The pair of ophthalmic lenses according to claim 1, wherein each of the ophthalmic lenses has a non-spherical front surface.

16. The method according to claim 13, wherein said pair of ophthalmic lenses are adapted to be mounted in a head-mounted display device, and the rear surfaces have an absolute value difference of surfacic mean spherical power and an absolute value difference of surfacic cylindrical power at any point over a given reference zone smaller than or equal to 0.1 D, said reference zone being defined by a shape of a frame of the head-mounted display device.

17. The apparatus according to claim 14, wherein said pair of ophthalmic lenses are adapted to be mounted in a head-mounted display device, and the rear surfaces have an absolute value difference of surfacic mean spherical power and an absolute value difference of surfacic cylindrical power at any point over a given reference zone smaller than or equal to 0.1 D, said reference zone being defined by a shape of a frame of the head-mounted display device.

* * * * *